United States Patent [19]

Gupta et al.

[11] Patent Number: 5,058,129
[45] Date of Patent: Oct. 15, 1991

[54] TWO-WIRE DIGITAL TRANSMISSION LOOP

[75] Inventors: Dev V. Gupta, Flemington; Kyung-Yeop Hong, Somerville, both of N.J.

[73] Assignee: Integrated Network Corporation, Bridgewater, N.J.

[21] Appl. No.: 419,839

[22] Filed: Oct. 11, 1989

[51] Int. Cl.⁵ .............................................. H04B 1/48
[52] U.S. Cl. ........................................ 375/7; 375/17; 375/39; 371/49.3
[58] Field of Search ..................... 375/7, 8, 38, 39, 17; 370/20; 455/60; 371/49.14

[56] References Cited

U.S. PATENT DOCUMENTS

| | | | |
|---|---|---|---|
| 3,522,537 | 8/1970 | Boughtwood | 375/39 |
| 3,710,257 | 1/1973 | Low et al. | 370/20 |
| 3,794,768 | 2/1974 | Cichetti, Jr. et al. | 370/84 |
| 3,824,501 | 7/1974 | Harris | 333/18 |
| 3,937,882 | 2/1976 | Bingham | 375/10 |
| 3,965,294 | 6/1976 | Renz et al. | 375/17 |
| 4,227,250 | 10/1980 | Wynder | 375/37 |
| 4,236,248 | 11/1980 | Teramura et al. | 375/8 |
| 4,355,397 | 10/1982 | Stuart | 376/39 |
| 4,584,690 | 4/1986 | Cafiero et al. | 375/18 |
| 4,586,023 | 4/1986 | Thomson | 375/7 |
| 4,745,622 | 5/1988 | Gupta | 375/14 |
| 4,771,418 | 9/1988 | Narasimham et al. | 370/110.1 |
| 4,799,217 | 1/1989 | Fang | 370/68.1 |
| 4,811,359 | 3/1989 | Nakajima et al. | 375/40 |
| 4,882,726 | 11/1989 | Lang et al. | 375/8 |

OTHER PUBLICATIONS

Handbook of Data Communications John D. Leak 1984 pp. 90–94.
"System Aspects", Henning et al., *The Bell System Technical Journal*, Oct. 1972, vol. 51, No. 8, pp. 1641–1657.
"Representation of Bandpass Stationary Stochastic Processes", *Digital Communications*, Proakis, J. G. 1983, pp. 110–113.

*Primary Examiner*—Benedict V. Safourek
*Assistant Examiner*—Young Tse
*Attorney, Agent, or Firm*—Hamilton, Brook, Smith & Reynolds

[57] ABSTRACT

A quadrature coder for a two-wire digital loop communication system is described in which data is sampled and quadrature encoded by being divided into two bit streams, one of which comprises every other bit in the original bit stream and the other one comprises the remaining bits. One of the divided bit streams is delayed by 90° from the other. The delayed and undelayed bit streams are then recombined and transmitted over a two-wire loop.

15 Claims, 9 Drawing Sheets

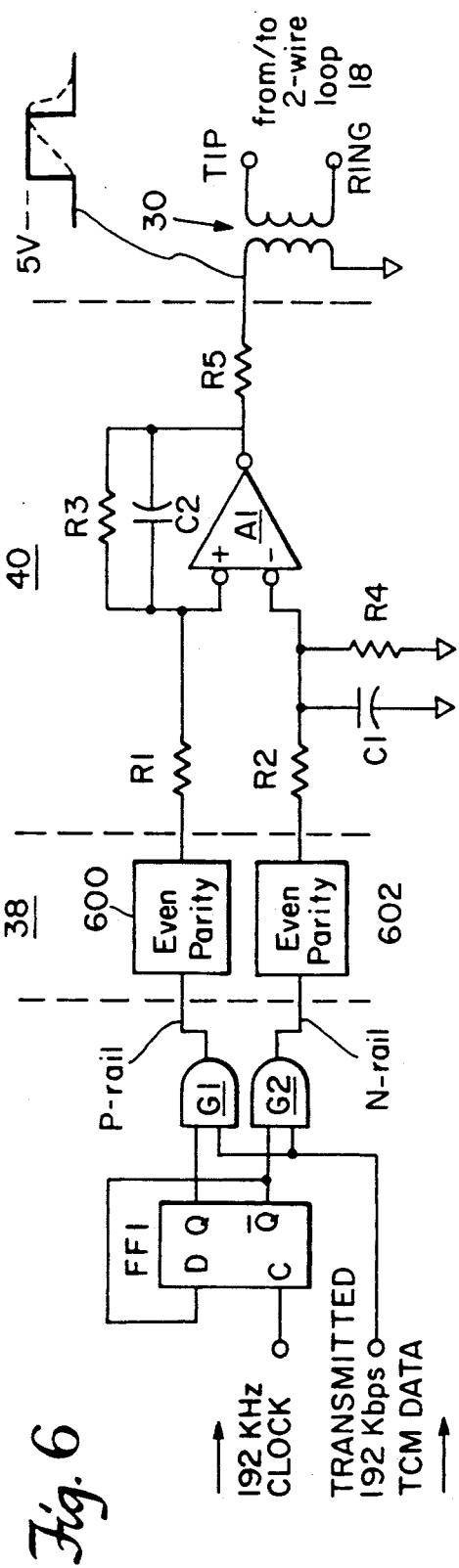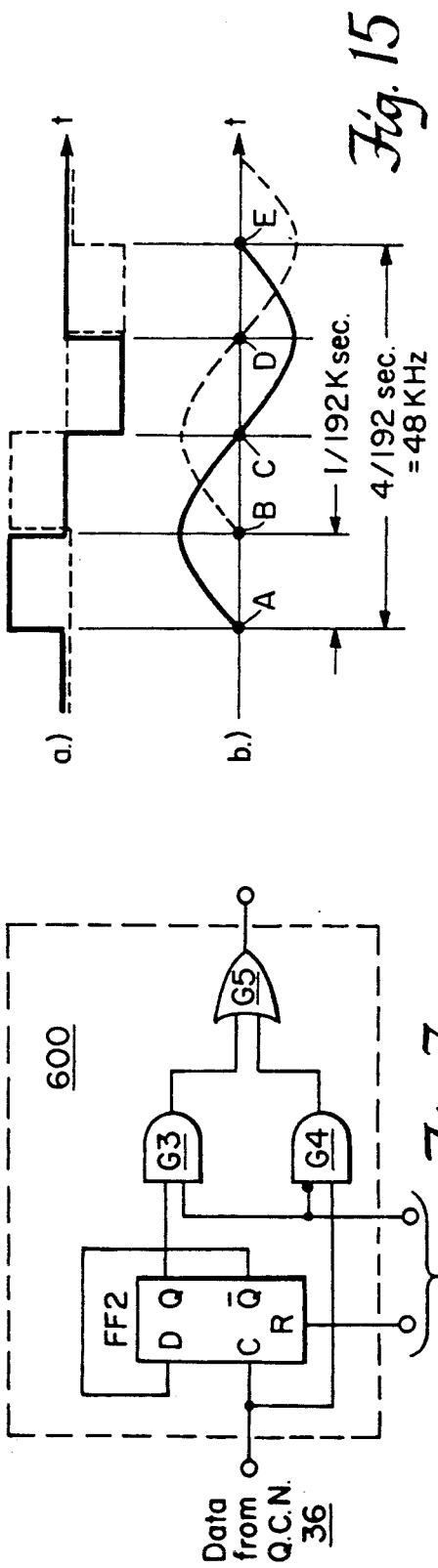

TWO-WIRE DIGITAL TRANSMISSION LOOP

BACKGROUND ART

Current state of the art communication systems transmit information in the form of digital signals. The digital signals consist of bipolar pulse code modulated (PCM) signal pulses wherein information is represented by a binary "1" or a binary "0" and wherein a "1" may be a positive going pulse or a negative going pulse. Typically, such PCM pulses are transmitted as Alternate Mark Inverted (AMI) pulses, in which every other pulse is inverted to avoid build-up of a D.C. level on the transmission line. The AMI pulse may be either a Return-To-Zero (RZ) or Non-Return-To-Zero (NRZ) pulse. In the RZ system, each pulse is allowed to go from a positive or negative value back to zero, whereas in the NRZ system, the pulse is not allowed to return to zero at the end of its period. The present invention is directed to PCM, AMI, RZ telephone communication from a subscriber over two-wire conductive lines, referred to as loops or wire pairs. These lines represent an existing dedicated facility created at great expense and which requires a large amount of labor and investment to maintain. If the capacity of these two-wire lines could be increased by increasing the bit rate at which information could be communicated, without degrading the signal, substantial benefits would result.

One of the factors limiting the bit rate in wire pairs is the need to manage the subscriber loop electromagnetic spectrum to allow various services to coexist in adjacent subscriber loops without creating high frequency signals which would interfere with one another.

A need exists, therefore, for a method and apparatus for increasing communication bit rates over wire pairs without exceeding predetermined frequency constraints which would result in performance degradation.

SUMMARY OF THE INVENTION

In accordance with the present invention, a method and apparatus is provided in which data in the form of bipolar pulse code modulated AMI RZ bit sequences are quadrature encoded in a manner which modifies the spectra of the transmitted data, such that the data can be transmitted at a much higher bit rate than non-quadrature encoded bit sequences, while maintaining an amplitude versus frequency response spectrum equal to or less than that of a non-quadrature encoded bit sequence transmitted at the lower rate.

Quadrature encoding comprises sampling the normal AMI RZ bit stream at the bit rate "F" and dividing the bit stream into two streams, a positive "P" stream and a negative "N" stream, each having a bit rate of F/2. The "P" stream comprises every other bit from the original stream. The remaining bits from the "N" stream are phase shifted $n\theta$ degrees with respect to the "P" stream. $\theta$ is 90° and n is an odd integer, preferably 1. Hence, the terminology "Quadrature" encoder. Note that a 90° phase shift is equivalent to a time delay of 1/F.

The "P" stream is coupled to the positive input line of a summing circuit and the "N" stream is coupled to the negative input line of the summing circuit. The two bit streams are linearly combined or superimposed on each other in the summing circuit.

The combined bit stream is then transmitted at a bit rate of "F".

The combined bit stream is transmitted from a master station in one direction on a two-wire line to a slave station at the subscriber or customer's office during one time slot. The data on the bit stream is recovered at the slave station. After the master station has completed transmission, the slave station transmits in the opposite direction during a later time slot. A time delay greater than the round trip delay of the largest anticipated cable between stations is provided between transmissions to avoid collisions.

The above, and other features and advantages of the invention, will now be described, in detail, in connection with the following drawings.

BRIEF DESCRIPTION OF THE DRAWINGS

FIG. 6 is a schematic of the quadrature coding network and pulse shaping network.

FIG. 7 is a schematic of an even parity generator.

FIG. 15 is a timing diagram showing the two 96 Kbps rail signals before (a) and after (b) pulse shaping, transmission and equalization.

DETAILED DESCRIPTION OF THE INVENTION

I. Overall System

Figure 1:
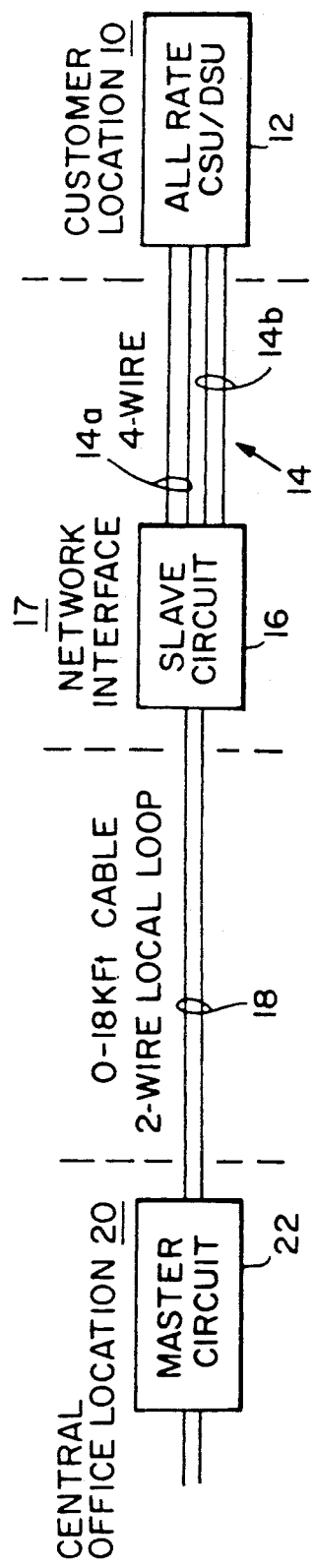
FIG. 1 is a block diagram of the transmission loop network of the invention.

Referring now to FIG. 1, the apparatus of the invention will be described in general, before proceeding with the details in FIGS. 2 and 3. As shown in FIG. 1, at the customer's premises 10, telephone equipment 12, labeled "ALL RATE CSU/DSU", is presently installed which may communicate at a number of different rates ranging from 2.4 to 64 kilobits per second (Kbps). Such equipment is designed to communicate over four-wire lines 14 with one pair of wires 14a forming a transmit path, and the other, a receive path resulting in four-wire full duplex communication. In accordance with the present invention, a slave circuit 16 is provided which interfaces between the four-wire loop at the customer location and the two-wire local loop 18, which extends to the central office location 20. As will be shown, the slave circuit 16, in conjunction with master circuit 22, more than doubles the communication capacity of the wire pair 18, by increasing the present maximum allowable transmission rate from 56 kbps to 192 kbps, while still retaining acceptable frequency limits of the resultant spectra.

In one direction, the receive path, unit 16 converts the data bit rate received from the central office 20 to the local rate at the customer location 10, and vice versa in the opposite direction, or transmit path. Unit 16 also time compresses and multiplexes/demultiplexes (TCM's) the data. Circuit 16 also processes the TCM digital signal to encode the digital signal in a manner which optimizes the frequency of the transmitted spectra at the higher transmission rate, thereby allowing various services to exist in adjacent subscriber loops without interference. Subsidiary functions, such as signal equalization, both fixed and adaptive, and timing and data recovery, are also performed by the slave circuit 16.

Data is transmitted from the slave circuit 16 to the master circuit 22 in "ping-pong" fashion over two-wire loop 18 at a bit rate of 192 kbps. When circuit 22 is transmitting, circuit 16 is quiescent and only transmits after a predetermined time delay in excess of the maximum propagation delay of the two-wire pair 18.

Figure 8:
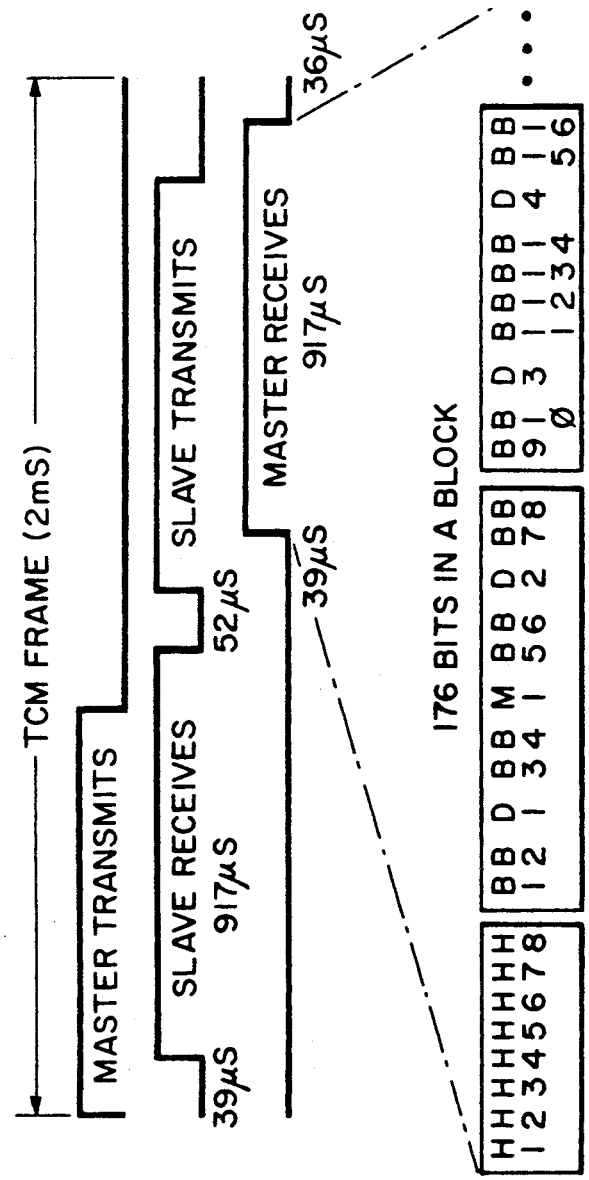
FIG. 8 is a timing diagram illustrating the framing pattern of the invention.

As shown in FIG. 8, a TCM frame occupies a 2 ms time slot. Binary bits are transmitted in a block of 176 bits. Each block occupies a 917 $\mu$s time slot. After the master circuit transmits, the slave circuit receives the TCM block a maximum of 39 $\mu$s later (29 $\mu$s delay for a maximum cable run of 18K feet of 26 gauge wire at 48 KHz plus 10 $\mu$s delay in the equalizer and logic circuit).

The slave circuit 16 receives a block of information, and after a 52 $\mu$s time delay, commences transmission in the opposite direction back to the master circuit 22. This built in delay is provided to avoid any possible collision of blocks. The 176 bits in a block contains 8 header bits used for framing of bytes in a block and 168 data bits arranged in various channels labeled 128B-channel data 32 D-channel data and 8 M (maintenance)-channel data.

Referring back to FIG. 1, master circuit 22 receives the 192 kbps TCM signal from slave circuit and performs the necessary equalization to regenerate the original data encoded signal and recovers timing and data from the equalized signal and converts the data format from the two-wire bit rate of 192 kbps to the DS$\phi$ data rates used at the central office, i.e. 64 kbps.

In the transmit path, the master circuit multiplexes the transmitted data, which could be at any rate in the range of 2.4, 4.8, 9.6, 19.2, 56 or 64 kbps, and encodes the transmitted data to 192 kbps TCM data so as to optimize the spectra of the transmitted signal. The encoder shifts every other bit in a sample bit sequence by $n\theta$ degrees wherein n equals an odd integer and $\theta$ equals 90°. In so doing, the channel bandwidth required to accommodate a predetermined data rate is reduced by one-half.

The details of this encoding system will now be described in connection with FIGS. 2 and 3.

II. Master Unit

In the master unit 22, digital signals are received, during receive intervals, from two-wire loop 18 across the tip and ring terminals of the primary winding 30a of hybrid transformer 30. The digital signals are in the form of alternate mark inversion (AMI) return to zero (RZ) digital voltage PCM pulses generated at rates which may be as low as 2.4 kbps or as high as 64 kbps. These signals have been quadrature coded at the slave circuit 16 and propagated over two-wire loop 18 as the linear combination of two rails of 96 kbps data, one labeled a P-rail and the other labeled an N-rail.

The received recombined rails of digital signals are inductively coupled to the secondary 30b of hybrid transformer 30 and to an equalizer and slicer circuit 32. Circuit 32 may comprise a well-known bi-quad equalizer, as described in U.S. Pat. No. 3,824,501 to Haris, or a more advanced post-equalizer, as shown in U.S. Pat. No. 4,745,622 to Gupta. The post-equalizer compensates the received signal for cable loss incurred in propagation along the two-wire loop 18. The slicer part of circuit 32 derives the logic level for the TCM logic circuit 34 from the equalized signal and may comprise a header slicer and a data slicer. The header slicer slices the first header and provides the rising edge of the sliced output to the data and timing recovery circuits.

The resultant first rising edge of sliced output is used for a phase input to recover data from the received 192 Kb/s TCM data.

Figure 12:
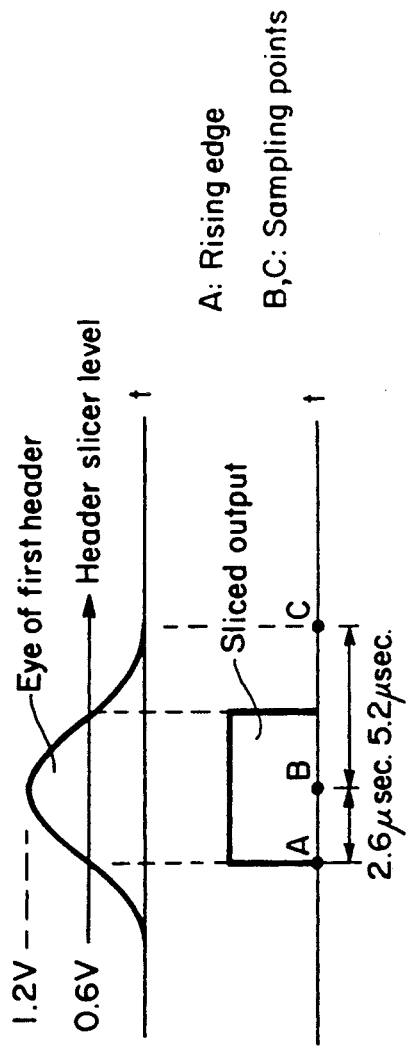
FIG. 12 is a waveform diagram illustrating the operation of the header slicer circuitry of the invention.

As shown in FIG. 12, the sampling points for the slicer are located at every 5.2 $\mu$ seconds (1/192K seconds) intervals starting from 2.6 $\mu$ seconds after the time of the first rising edge.

This means that by adjusting the header slicer level, sampling points can be optimized to be located on the center of sliced data output pulses.

The data slicer has ±0.6 V slicer level which is one-half of the height of the eye. This yields the widest sliced output because of the rhombic shape of the eye opening shown in darkened lines in the "eye diagram" of FIG. 13. The "eye opening" defines an optimum decision region in each transmission frame that is best suited for signal regeneration. [For an explanation of "eye diagrams", see *Data Transmission* by W. R. Bernett and J. R. Davey, page 119, McGraw-Hill (1965)].

Figure 9:
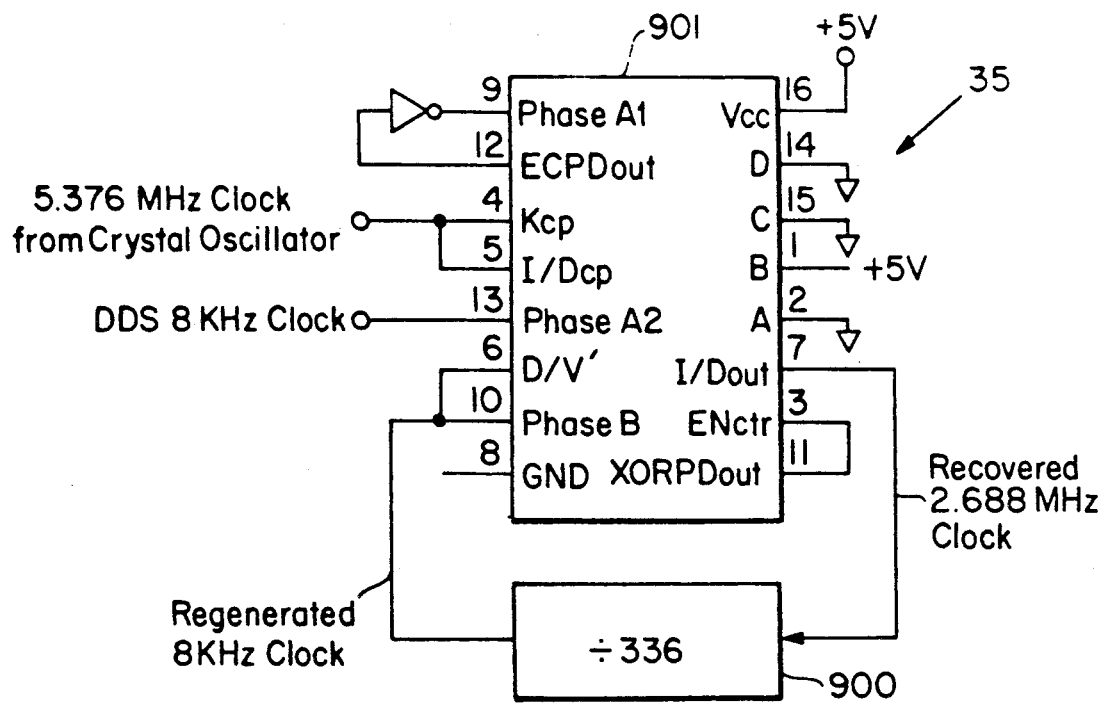
FIG. 9 is a schematic of the timing recovery circuit in the master circuit.
Figure 10:
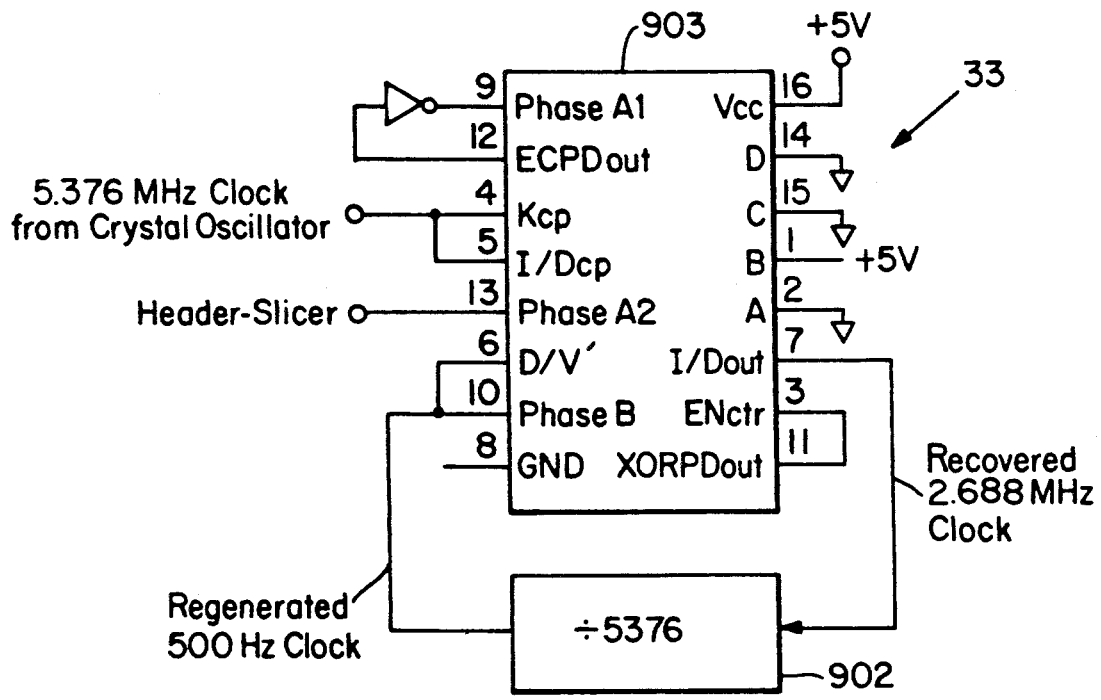
FIG. 10 is a schematic of the data recovery circuit in the master circuit.

As shown in FIGS. 9 and 10, respectively, both the timing recovery circuit 35 and data recovery circuit 33, utilize a Digital Phase-Locked Loop (DPLL) circuit 901 and 903, respectively, for data and timing recovery. Preferably, this DPLL is a 74HC297 chip made by Signetics. The timing recovery circuit 35 is used to recover clock timing signals from the central office DDS clock, which is provided from the central office at terminal 13, and to generate the necessary clocks, i.e., recovered 2.688 mHz clock pulses at terminal 7 for the transmitted and received DS$\phi$ data and the transmitted 192 Kb/s TCM data.

Data recovery is used to recover data from the received 192 Kb/s TCM data. The data recovery circuit 33 (FIG. 10) uses the first header of a TCM frame and the regenerated 500 Hz clock at terminals 6 and 10 as phase inputs to phase-lock the rising edge of the regenerated 500 Hz clock onto the rising edge of the sliced first header. Similarly, timing recover circuit 35 (FIG. 9) uses the DDS 8 KHz clock and the regenerated 8 KHz clock at terminals 6 and 10 as phase inputs to phase-lock the rising edge of the regenerated 8 KHz clock onto the rising edge of the DDS 8 KHz clock. Note that the regenerated clocks are obtained by dividing the recovered 2.688 mHz clock by 336 and 5376, respectively, in divider circuits 900 and 902, respectively.

Figure 11:
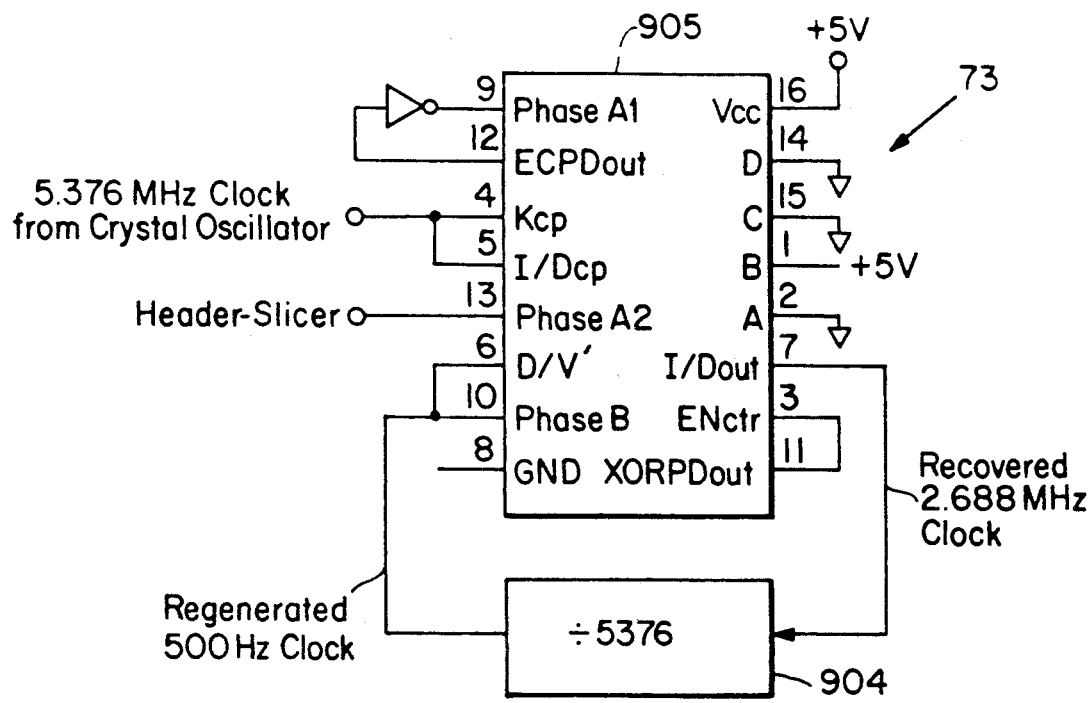
FIG. 11 is a schematic of the data and timing recovery circuit in the slave circuit.

In the data/timing recovery circuit 73 (FIG. 11) of slave circuit 16 (FIG. 1), only one DPLL is required for data and timing recovery. In the customer's premises, where the slave circuit is located, no reference clock, such as the CO DDS 8 KHz clock is available. Therefore, all necessary clocks for transmitting and receiving data are generated based on loop timing by recovering the received 192 Kb/s TCM data.

The data and timing recovery circuit uses the first header of the TCM frame and the regenerated 500 Hz clock as phase inputs to phase-lock the rising edge of the regenerated 500 Hz clock onto the rising edge of the sliced first header.

The recovered data is coupled to TCM logic circuit 34, where it is demultiplexed down to the bit rate of 64 kbps for transmission through the switching system.

Figure 14:
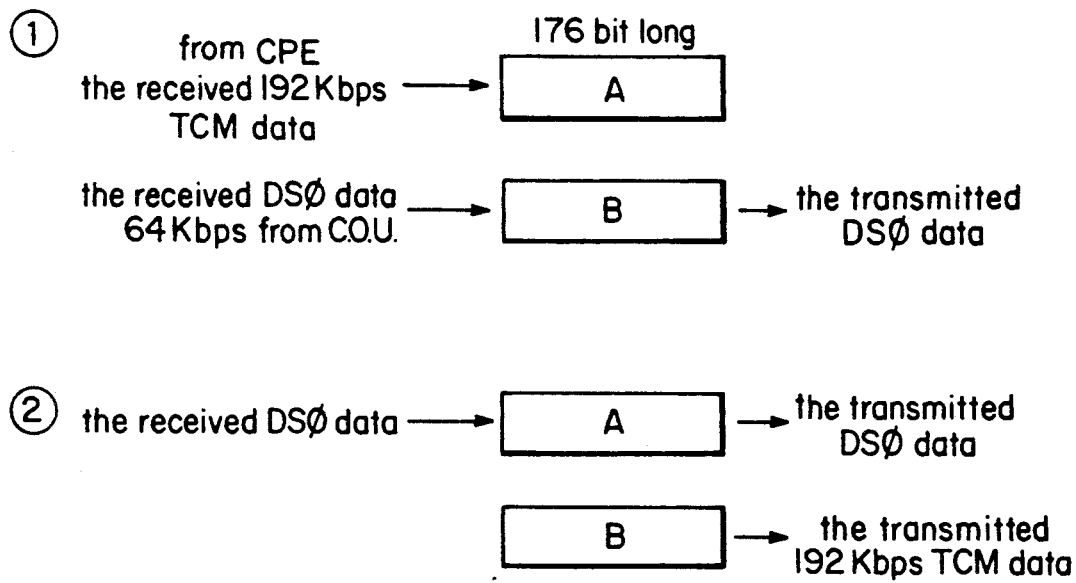
FIG. 14 is an illustration of the method of transmission between slave and master in accordance with the invention.

The TCM logic 34 utilizes two shift registers, A and B (See FIG. 14). In a first TCM frame ①, the shift register A is used to store the received 192 Kb/s TCM data in 176 bit long blocks. At the same time, the shift register B is used to store the received DSφ data and shift out the transmitted DSφ data which is the received 192 Kb/s data from the previous TCM frame.

In the next frame ②, the received DSφ data in the shift register B are shifted out as the transmitted 192 Kb/s data. At the same time, the received 192 Kb/s TCM data in the shift register A is shifted out as the transmitted DSφ data, and the received DSφ data B is shifted into the shift register A.

Incoming signals from the switching system are multiplexed from a maximum rate of 64 kbps to a rate of 192 kbps in TCM logic 34 for transmission over two-wire loop 18 to the subscriber.

Figure 2:
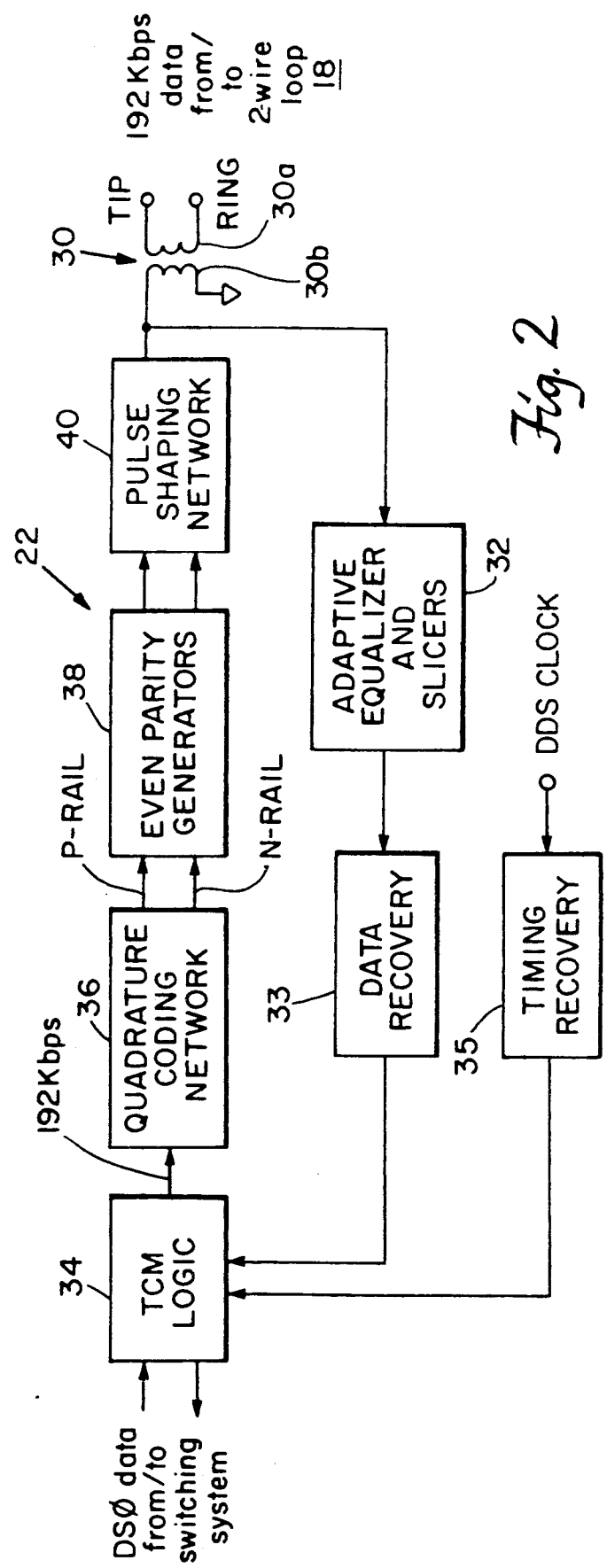
FIG. 2 is a block diagram of the master circuit 22 of FIG. 1.
Figure 3:
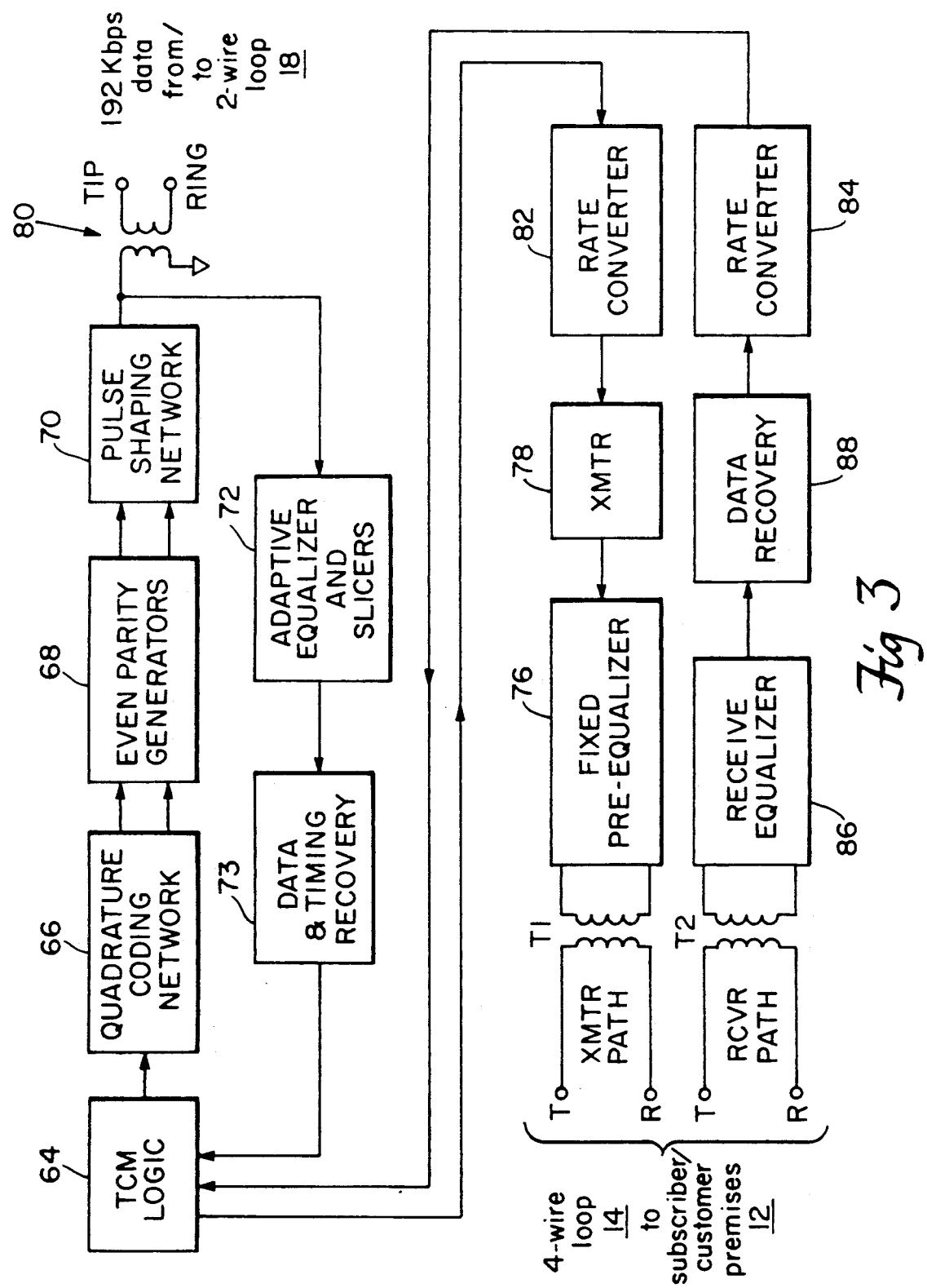
FIG. 3 is a block diagram of the slave circuit 16 of FIG. 1.

The Quadrature Coding Network (QCN) 36, sometimes referred to as "a quadrature encoder" even parity generators 38, and pulse shaping network 40 of FIG. 2 are shown in detail in FIG. 6.

The QCN 36 consists of a D-type toggle flip-flop FF1 with two output signals. The Q output is coupled to AND gate G1 and the complementary output $\overline{Q}$ to one input of AND gate G2. The other inputs to AND gates G1 and G2 constitute the transmitted AMI RZ 192 kbps TCM data signals. The clock input C of FF1 receives a 192 KHz clock signal from the timing recovery circuit 35 and the data input D is tied to the $\overline{Q}$ output signal.

Figure 4:
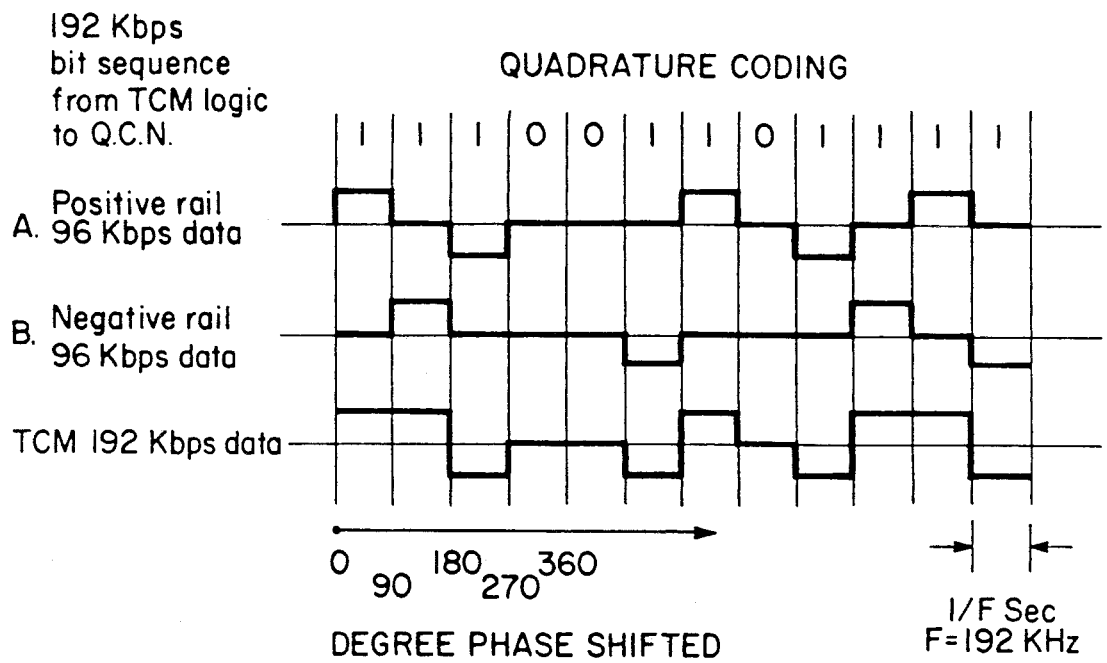
FIG. 4 is a timing diagram illustrating the quadrature coding method.

Coincidence at AND gate G1 between the TCM pulse data at 192 kbps and every other 192 kbps clock pulse provides an output at G1 corresponding to every other TCM data input pulse, or a 96 kbps RZ data rail (See the solid curve in FIG. 15a and the waveform labeled A in FIG. 4) which is eventually coupled to the positive input of summing amplifier A1 and, hence, is labelled a P-Rail. Conversely, coincidence at AND gate G2, between the TCM pulse data at 192 kbps and every other complementary 192 kbps clock pulse, produces a 96 kbps RZ data N-rail (curve B of FIG. 4) which is delayed by 1/192K seconds to produce a 90° phase shift (dotted curve in FIG. 15a) which is coupled to the negative input terminal of summing amplifier A1.

The P-rail and N-rail bit sequences are separately coupled to EVEN PARITY generators 600 and 602, respectively, which provides an equal number of positive and negative marks on both rails to guarantee a constant DC level. This results in a linear decision threshold at which the presence or absence of a mark may be determined.

EVEN PARITY generator 600 is shown in detail in FIG. 7. It consists of a toggle flip-flop circuit FF2 which accumulates the number of ONE bits on the P-rail received at the clock input C during each frame. The P-rail is also coupled to one input of AND gate G4.

FF2 is reset by a timing pulse at R from the timing recovery circuit 35 which occurs at the beginning of each frame. A ONE bit timing pulse from the timing recovery circuit 35 is coupled to an input terminal of each of AND gates G3 and G4 at the end of each frame.

AND gate G4 produces data from Q.C.N. 36 at all times, except at the end of a frame; whereas AND gate G3 only produces a ONE bit output during the last bit in a frame if the count of ones in toggle FF2 is an odd count. The outputs of AND gates G3 and G4 are OR'd in G5 to produce a constant D.C. level data stream. EVEN PARITY generator 602 operates as above on the N-rail data and need not be further described herein.

The P-rail and N-rail are separately coupled from respective EVEN PARITY generators 600 and 602 to a pulse shaping network 40 (shown in detail in FIG. 6) where the two 96 kbps rails are superimposed by summation in operational amplifier A1 (such as Motorola OpAmp MC34081) after passing through respective low pass filters (cutoff frequency = $1.3 \times 96$ kbps). The low pass filters comprise RC networks of R3/C2 (in parallel) coupled in series with resistor R1 and R2/C1 in parallel with series resistor R2. The resultant wave shape for a given pulse is shown at load resistor R5. The waveforms for each rail before pulse shaping and after transmission and equalization are shown in FIG. 15(a) (before) and 15(b) (after) (solid line denotes the P-rail and dotted line the N-rail).

Figure 13:
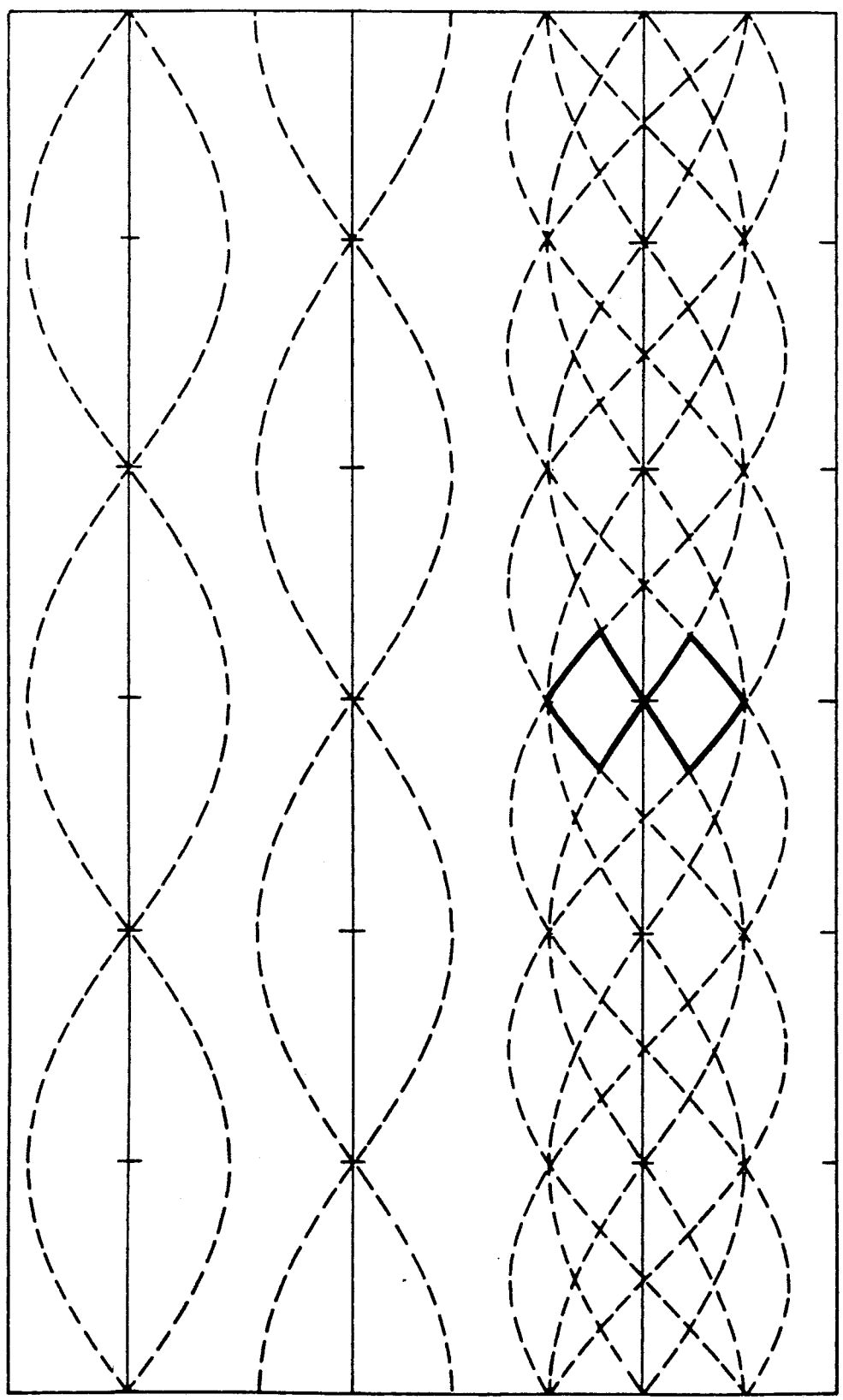
FIG. 13 is an "eye" diagram.

The result is that the positive (or negative) rail of the Return-To-Zero AMI (Alternate Mark Inversion) data sequence becomes sinusoidal in form after passing through the pulse-shaping network 40 (FIG. 2) and loop 18 and the receive equalizer 72 (FIG. 3), as shown in FIG. 7(b) and in the EYE DIAGRAM of FIG. 13.

Note also that on the waveform of the positive rail (FIG. 15b) there are always ZERO crossing points (A,C,E) between centers of eyes (B,D), where more information can be sent without causing intersymbol-interference. Note, also, that the negative rail data is transmitted 1/192K seconds after the positive rail data is transmitted. FIG. 15(b) also illustrates that a 90° phase difference is equivalent to 1/192K seconds in the time domain because two marks of 96 Kb/s form a sinusoidal waveform which has the cycle of 4/192K seconds.

The above attributes of quadrature coding are provided in the present invention by appropriate location of the receiver sampling points. Thus, at the receiver (FIG. 3) in slave circuit 16, the slicer circuit 72 and data recovery circuit 73 are arranged such that points B,D become the sampling points of the positive rail data and the points A,C,E become the sampling points of the negative rail data.

So, instead of transmitting one 192 Kb/s RZ AMI data rail, the QCN 66 sometimes referred to as "a quadrature encoder" provides transmission of two 96 Kb/s RZ AMI data rails to optimize the spectra of the transmitted data.

The Nyquist frequency of the 96 Kb/s RZ AMI data sequence is 48 KHz, while the Nyquist frequency of the 192 Kb/s RZ AMI data sequence is 96 KHz.

Figure 5:
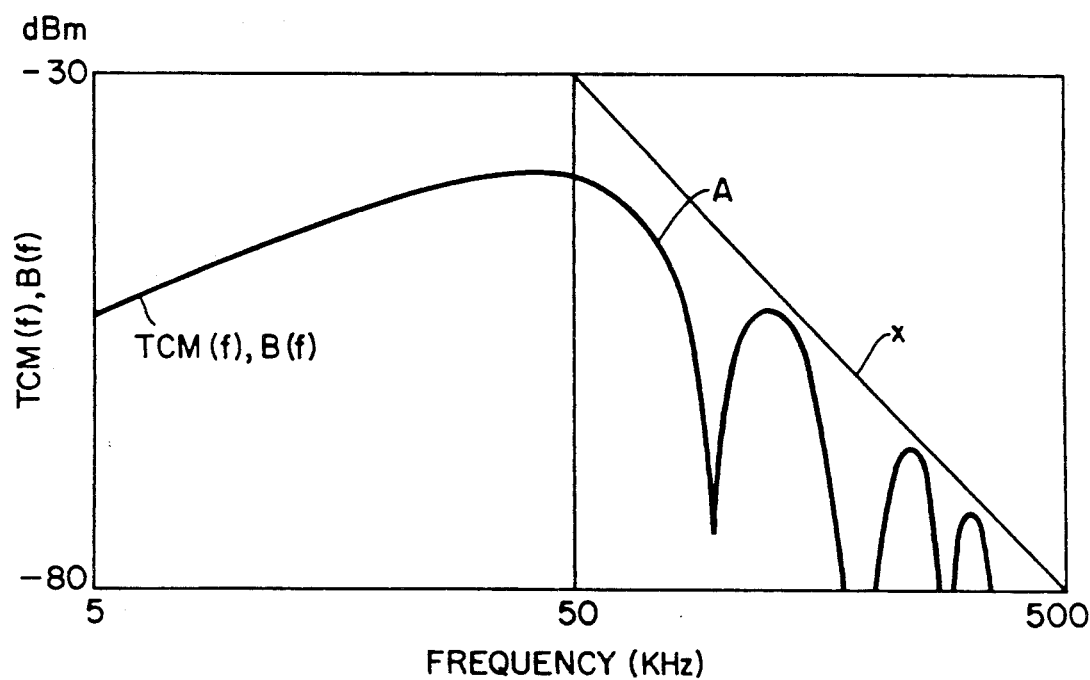
FIG. 5 is a plot of the power spectra in decibels of the transmitted time compressed multiplexed (TCM) quadrature coded 192 kbps signal from the master circuit versus the frequency content in kilohertz.
Figure 5A:
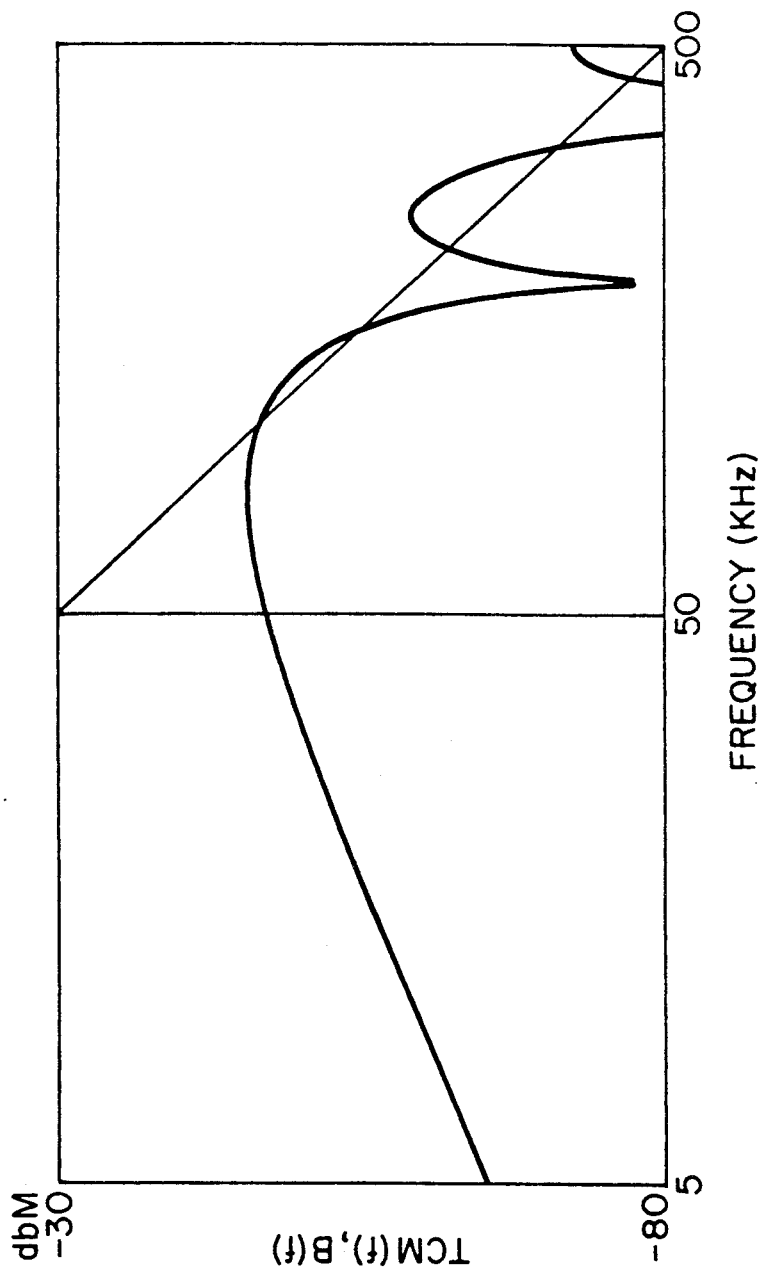
FIG. 5(a) is a plot, as in FIG. 5, for a non-quadrature coded signal.

It can be shown that by quadrature encoding of the 192 kbps TCM digital signal, the channel bandwidth required to accommodate that rate is reduced by one-half. In particular, in FIG. 5 is shown a computer simulated plot of power level in dBm versus frequency for the combined quadrature coded 192 kbps TCM pulse signal with the power level line X indicating the power versus frequency level limits imposed by the operating system requirements. Thus, in the frequency range of 50 to 500 KHz, the power level must be below line X. As can be seen from the plot of curve A, this requirement is achieved with margin to spare. By contrast, the computer simulated plot of a non-quadrature coded 192 kbps signal is shown in FIG. 5(a), from which it may be seen that the power level extends beyond the line X at a number of points.

III. Transmission System

As previously noted, the chart of FIG. 8 illustrates that each frame of the time compressed multiplexed transmission from the OCU master circuit 22 at the central office location 20 to the slave circuit 16, at the network interface and back, occupies a 2 millisecond time interval, labeled TCM Frame. This interval is broken up into a 917 microsecond block interval during which the OCU master circuit 22 transmits the 176 bits constituting a block of data. The 176 bits are comprised of 8 header bits and 168 data bits. The header bits are predetermined logic states, i.e., ones or zeroes used for phase locking the slave circuit to the master circuit. The 168 data bits can be sub-divided into various channels, i.e., a main channel of 128 bits for customer data, a 32 bit channel for network information and an 8 bit channel for maintenance data. While the OCU master unit 22 transmits, the slave circuit 16 receives.

After a 52 microsecond delay from the end of the master unit transmission, the slave unit 16 is allowed to transmit its block of 176 bits for a period of 917 microseconds. The 52 microsecond delay allows for a maximum delay of 29 microseconds (18 kilofeet of 26 gauge wire at 48 kilohertz) in cable propagation time and 10 microseconds circuit delay. Since 168 data bits per microsecond are transmitted in a block from master to slave, followed by 168 data bits in the opposite direction from slave to master, the actual data bit rate is 168 divided by 2, or 84 kbps.

IV. Slave Circuit

The slave circuit 16 will now be described, in detail, in connection with FIG. 3. As shown in FIG. 3. AMI RZ digital data signals, at rates which may vary from as low as 2.4 to a high of 64 kbps, are transmitted from the subscriber/customer premises equipment 12 across the T and R wires on the receive path of a 4-wire loop and couple to the primary of transformer T2. The received signals are equalized in equalizer 86, which may comprise a fixed zero circuit and slicer. The equalizer regenerates the original signal, which may have suffered up to 14 dB loss at 28 KHz. The data recovery circuit 73 is similar to that used in the master circuit and utilizes a phase locked-loop (PPL), as previously described in connection with FIG. 11, to convert the RZ AMI regenerated signal into a logic level signal and to recover loop rate clocks for timing and synchronization. Rate converter 84 is a loop rate to DS$\phi$ converter which maps data received from the data recovery circuit 88 to form an 8th control bit and combines the 8th bit with seven data bits to form a 64 kbps data stream as the input to TCM logic 64. The TCM logic circuit 64, quadrature coding network 66, even parity generator 68 and pulse shaping network 70 and input/output transformer 80 all operate substantially as described in connection with their counterparts in FIG. 2 and need not further be described herein.

Likewise, circuits 72 and 73 process signals received from the master circuit 22 over two-wire loop 18 in the same fashion as their respective counterparts 33 and 32 of FIG. 2.

Rate converter 82 is a DS$\phi$ to loop rate converter which takes the 64 kbps received signal from the TCM logic circuit and converts it to the appropriate local loop rate for transmission to the subscriber premise 12 over the XMT path of four-wire loop 14.

A line driver circuit forms a transmitter 78 for the rate converted digital signal. A fixed frequency-attenuation transfer function in pre-equalizer 76 is provided to the transmitted signal to pre-equalize the signal for the known maximum loss over the four-wire loop 14 (14 dB and 28 KHz is approximately equal to 6 K feet of 26 gauge cable). This transfer function is the inverse of the gain function corresponding to 10 K feet of 26 gauge cable. Pre-equalization permits detectable transmission of small voltage amplitude signals and consequent reduction of power consumption.

The output of pre-equalizer 76 is coupled across output transformed T1 to the tip (T) and ring (R) wires of the transmit path of four-wire loop 14 to the subscriber equipment 12.

Equivalents

This completes the description of the preferred embodiments of the invention. Many equivalent alternatives, improvements and modifications thereof, will become apparent to those skilled in the art. Such equivalents are intended to be encompassed within the scope of the following claims:

We claim:

1. A method of data communication between a four-wire service customer location with a slave interface circuit and a two-wire service central office location with a master interface circuit coupled by said two-wire service to said slave interface circuit, comprising the steps of:
    a) encoding an original bit stream of baseband PCM data for transmission from said master circuit to said slave circuit over said two wires during a first time interval T1 by:
        (i) dividing said bit stream into a P-Rail bit stream and an N-rail bit stream in which the P-Rail bit stream comprises every other bit from said original bit stream and the N-rail bit stream comprises the remaining bits from said original bit stream and wherein one of said rail bit streams is phase shifted by n$\theta$ degrees wherein n is an odd integer and $\theta$ is 90°;
        (ii) linearly combining the N-rail stream and P-Rail stream;
        (iii) transmitting the combined stream to the slave interface circuit during said time interval T1; and
        (iv) sampling the transmitted combined stream at sample points wherein components of said N-rail stream are at a minimum value when said P-Rail stream is sampled and wherein components of said P-Rail stream are at a minimum value when said N-Rail stream is sampled.

2. The method of claim 1 wherein the bit stream is comprised of bipolar pulse code modulation alternate mask inversion coded pulses and the combined bit stream is transmitted at the bit rate of the original data stream, but when received, the P-Rail bit stream is sampled at intervals between the N-rail bit stream and vice versa.

3. The method of claim 2 wherein the sample points are located 1/F seconds starting from ½F seconds after the first rising edge of a received bit.

4. A method of data communication between a four-wire service customer location with a slave interface circuit and a two-wire service central office location with a master interface circuit coupled by said two-wire service to said slave circuit, comprising the steps of:
- a) encoding an original bit stream of baseband PCM data for transmission from said master circuit to said slave circuit over said two wires during a first time interval T1 by:
  - (i) dividing said original bit stream into a P-Rail bit stream and an N-rail bit stream in which the P-Rail bit stream comprises every other bit from said original bit stream and the N-rail bit stream comprises the remaining bits from said original bit stream and wherein one of said rail bit streams is phase shifted by $n\theta$ degrees wherein $\theta$ equals 90° and n is an odd integer;
  - (ii) linearly combining the N-rail stream and P-Rail stream;
  - (iii) transmitting the combined stream to the slave interface circuit during said time interval T1;
- (b) receiving said combined bit stream at said slave circuit during time interval T1; and
  - (iv) sampling the transmitted combined stream at sample points wherein components of said N-rail stream are at a minimum value when said P-Rail stream is sampled and wherein components of said P-Rail stream are at a minimum value when said N-Rail stream is sampled;
- (c) after a predetermined time interval T2, encoding an original bit stream of baseband PCM data for transmission from said slave circuit to said master circuit over said two wires during a third time interval T3 by:
  - (i) dividing said bit stream into a P-Rail bit stream and an N-rail bit stream in which the P-Rail bit stream comprises every other bit from the original bit stream and N-rail bit stream comprises the remaining bits from said original bit stream and wherein one of said rail bit streams is phase shifted by $n\theta$ degrees wherein n is an odd integer and $\theta$ equals 90°;
  - (ii) linearly combining the N-rail stream and P-Rail stream; and
  - (iii) transmitting the combined stream to the master interface circuit during said third time interval T3.

5. The method of claim 4 wherein the combined streams are transmitted in frames and as a present frame of the combined bit stream is received at the slave interface circuit, the present frame is stored in a first storage device A while received data from the four-wire service for transmission is also stored in a second storage device B and data in device B from a previous frame is shifted out of device B for transmission over the four-wire service and wherein in the next frame, the received data in device B is shifted out for transmission over the two-wire service while at the same time, data received from the previous frame stored in device A is shifted out for transmission over the four-wire service while the next frame of data from the four-wire service is shifted into device A.

6. A communication system for data communication between a four-wire service customer location with a slave interface circuit and a two-wire service central office location with a master interface circuit coupled by said two-wire service to said slave circuit, comprising:
- a) an encoder for encoding by frames an original bit stream of baseband PCM data for transmission from said master circuit to said slave circuit over said two wires during a first time interval T1, said encoder comprising:
  - (i) a divider for dividing said bit stream into a P-Rail bit stream and an N-rail bit stream in which the P-Rail bit stream comprises every other bit from said original bit stream and the N-rail bit stream comprises the remaining bits from said original bit stream and wherein one of said rail bit streams is phase shifted by $n\theta$ degrees wherein n is an odd integer;
  - (ii) a summer for linearly combining the N-rail stream and P-Rail stream; and
  - (iii) a transmitter for transmitting the combined stream to the slave interface circuit during said time interval T1;
  - (iv) a receiver for sampling the combined stream at sampling points at which components from said P-Rail bit stream are at a minimum value when components from said N-Rail bit stream are at a maximum and vice versa to avoid intersymbol interference.

7. The system of claim 6 wherein the combined bit stream is transmitted at a bit rate greater than the bit rate of the original data stream.

8. The system of claim 6 wherein $\theta$ equals 90°.

9. The system of claim 6 further including a parity generator for insuring that an even number of ones are transmitted in each frame.

10. The system of claim 6 further including recovery means at the slave interface circuit for sampling the combined bit stream as it is received such that the N-rail bit stream and P-Rail bit stream are alternately sampled at respective sample points intermediate each other and separated by 1/F seconds wherein F equals the bit rate of the combined stream.

11. The system of claim 6 wherein the bit stream is formed of AMI RZ pulses.

12. A data communication system for data communication between a four-wire service customer location with a slave interface circuit and a two-wire service central office location with a master interface circuit coupled by said two-wire service to said slave circuit, comprising the steps of:
- a) an encoder for encoding an original bit stream of baseband PCM data for transmission from said master interface circuit to said slave circuit over said two wires during a first time interval T1, comprising:
  - (i) divider means for dividing said bit stream into a P-Rail bit stream and an N-rail bit stream in which the P-Rail bit stream comprises every other bit from said original bit stream and the N-rail bit stream comprises the remaining bits from said original bit stream and wherein one of the rail bit streams is phase shifted by $n\theta$ degrees wherein n is an odd integer and $\theta$ is 90°;
  - (ii) summing means for linearly combining the N-rail stream and P-Rail stream; and
  - (iii) transmitter means for transmitting the combined stream to the slave interface circuit during said time interval T1;

(b) a receiver at said slave interface circuit for receiving said combined bit stream during time interval T1 and for sampling the combined stream at sampling points at which components from said P-Rail bit stream are at a minimum value when components from said N-Rail bit stream are at a maximum and vice-versa to avoid intersymbol interference and after a predetermined time interval T2, encoding an original bit stream of data for transmission from said slave circuit to said master circuit over said two wires during a third time interval T3.

13. The system of claim 12 including in said receiver;
(i) divider means for dividing said bit stream into a P-Rail bit stream and an N-rail bit stream in which the P-Rail bit stream comprises every other bit from the original bit stream and N-rail bit stream comprises the remaining bits from said original bit stream and wherein one of said rail bit steams is phase shifted by $n\theta$ degrees wherein n is an odd integer and $\theta$ is 90°;

(ii) summer means for linearly combining the N-rail stream and P-Rail stream; and
(iii) transmitter means for transmitting the combined stream to the master interface circuit during said third time interval T3.

14. The system of claim 13 wherein the combined stream is transmitted in frames and as a present frame of the combined bit stream is received at the slave interface circuit, the present frame is stored in a first device A while received data from the four-wire service for transmission is stored in a second device B and data in device B from a previous frame is shifted out of device B for transmission over the four-wire service and wherein in the next frame, the received data in device B is shifted out for transmission over the two-wire service while at the same time, data received from the previous frame stored in device a is shifted out for transmission over the four-wire service while the next frame of data from the four-wire service is shifted into device A.

15. The system of claim 13 wherein the devices are shift registers.

* * * * *

UNITED STATES PATENT AND TRADEMARK OFFICE
CERTIFICATE OF CORRECTION

PATENT NO. : 5,058,129

DATED : Oct. 15, 1991

INVENTOR(S) : Dev V. Gupta and Kyung-Yeop Hong

It is certified that error appears in the above-identified patent and that said Letters Patent is hereby corrected as shown below:

Col. 12, line 17, delete "a" and insert ---A---.

Signed and Sealed this

Twenty-third Day of February, 1993

Attest:

STEPHEN G. KUNIN

*Attesting Officer*     Acting Commissioner of Patents and Trademarks